Feb. 12, 1929.
O. J. ZOBEL
DISTORTION COMPENSATOR
Filed June 26, 1924  2 Sheets-Sheet 1
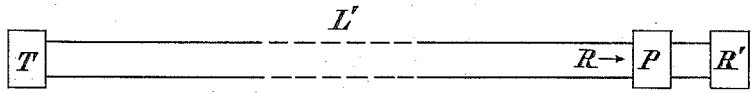
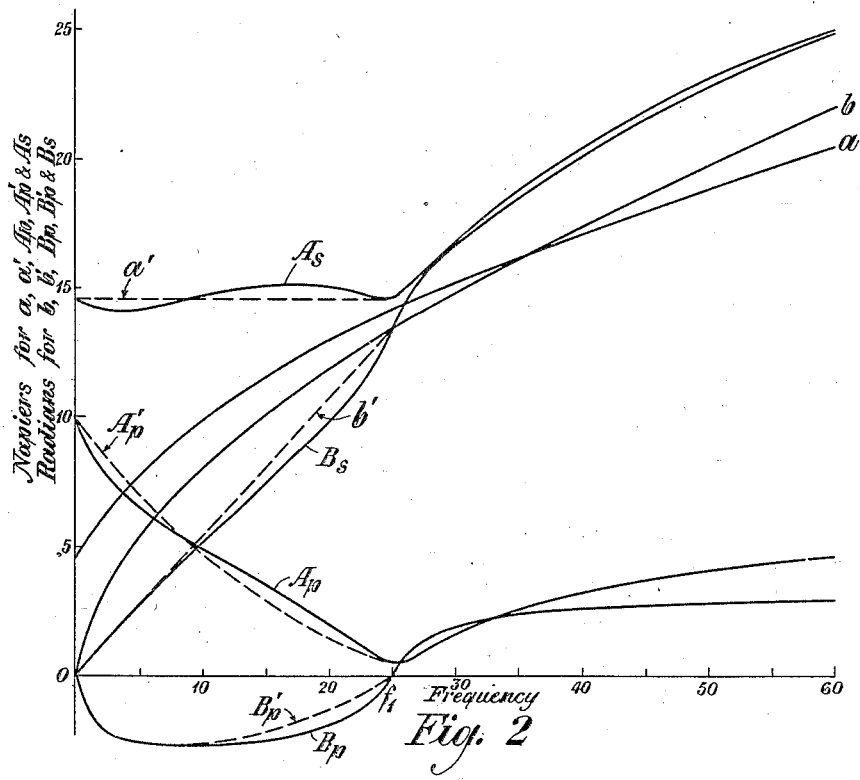
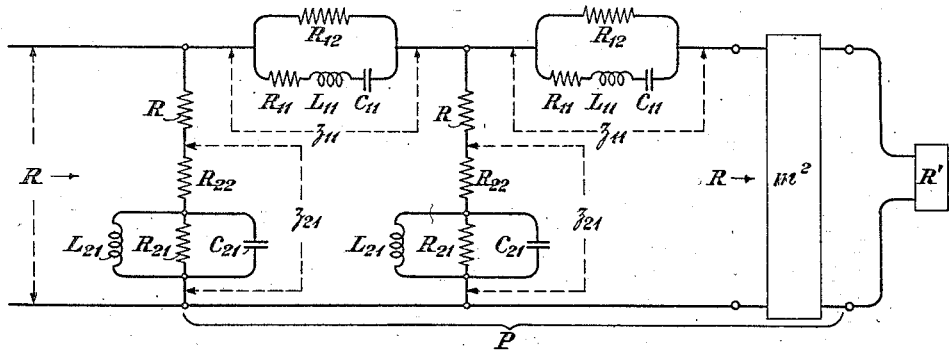
INVENTOR
O. J. Zobel
BY
ATTORNEY Feb. 12, 1929.　　　　　　　　　　　　　　　　　1,701,552
O. J. ZOBEL
DISTORTION COMPENSATOR
Filed June 26, 1924　　　　2 Sheets-Sheet 2

INVENTOR
O. J. Zobel
BY
ATTORNEY

Patented Feb. 12, 1929.

1,701,552

UNITED STATES PATENT OFFICE.

OTTO J. ZOBEL, OF NEW YORK, N. Y., ASSIGNOR TO AMERICAN TELEPHONE AND TELEGRAPH COMPANY, A CORPORATION OF NEW YORK.

DISTORTION COMPENSATOR.

Application filed June 26, 1924. Serial No. 722,506.

An object of my invention is to provide a new and improved electrical transmission system in which the frequency components of the current within a certain desired frequency range will be in the same phase relation with one another at the receiving end as at the transmitting end. Another object of my invention is to make the received composite wave form in such a system of the same shape as the transmitted wave form. Another object is to provide for a desired displacement in time of the respective frequency components of a composite alternating current. Another object is to provide for a suitable phase shift of currents of different frequencies in a circuit so as to bring them into a desired phase relation. Another object is to provide for a relative phase shift of the frequency components in the output from a transmission line to compensate for the phase shift on the line and to restore the components at the receiving end of the line to the same phase relation as at the sending end. Still another object is to provide a transducer at the receiving end of a transmission line that shall compensate the distortion due to differential phase shift and differential attenuation on the line.

By the term "transducer", as employed in this specification, I mean to refer to any apparatus having a pair of input terminals for the application of an electromotive force and a pair of output terminals by which electromotive force may be applied to an outside element, the output being a function of the input.

In the following specification I show specific examples of practice according to my invention. It will be understood that the specification relates largely to these particular cases and that the invention is defined in the appended claims.

Figure 4:
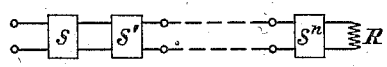
Figure 5:
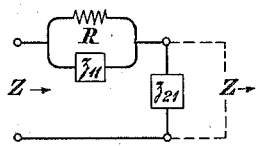
Figure 10:
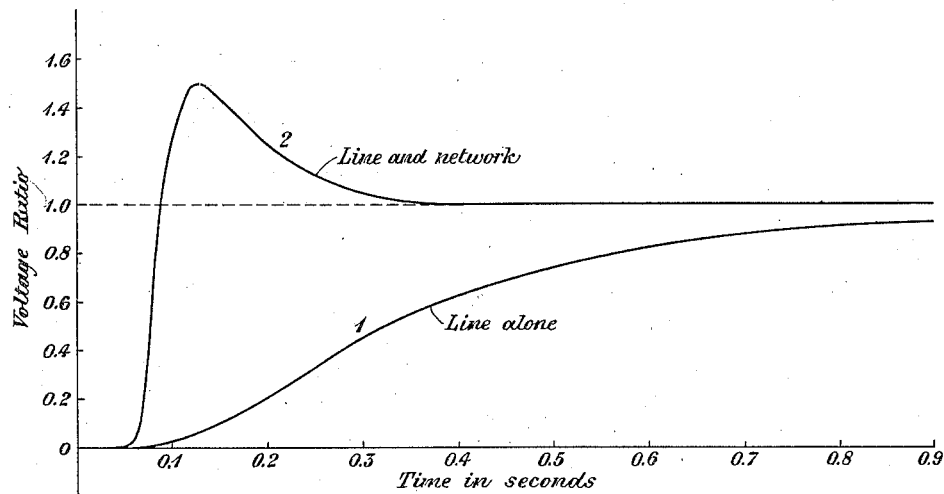
Figure 11:
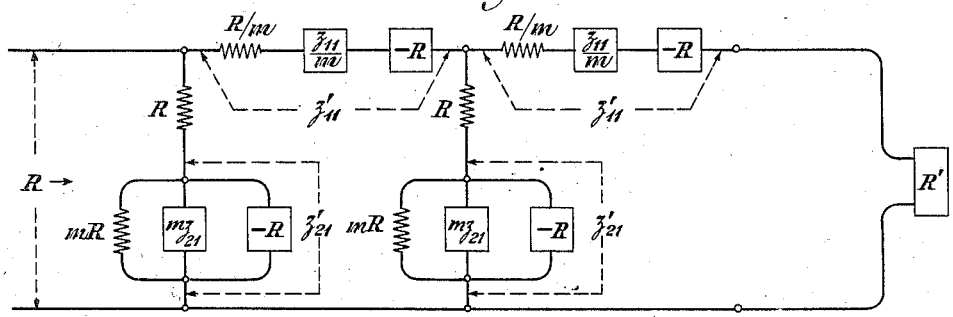

Referring to the drawings, Figure 1 is a diagram of a transmission system embodying my invention; Fig. 2 is a diagram showing phase and amplitude distortion as functions of frequency in several instances that will be referred to in this specification; Fig. 3 is a diagram of the apparatus P at the receiving end of the line L' of Fig. 1; Fig. 4 is a diagram of a recurrent network that will be referred to in explaining the principle of my invention; Figs. 5 to 9 are diagrams of alternative network sections that may be employed; Fig. 10 is an arrival curve diagram, and Fig. 11 is a diagram showing a modification.

Referring to Fig. 1, the line L' connects the transmitter T with the receiver R', through the network P whose input impedance is R, but those internal structure is as yet undetermined. R equals the resistance of the receiver R', which will be designed to be free from reactance. The line L' retards the current components of different frequencies by different amounts and also attenuates these components differently, and apparatus P is interposed at the receiving end to compensate the resultant distortion on the line, so that the received wave form shall be the same as at the transmitting end.

As an example to illustrate the nature of my invention, let it be assumed that the line L' is a submarine cable of length 1,700 miles, whose constants are Resistance $r=2.74$ ohms per mile;
Inductance $L=0.001$ henrys per mile;
Capacity $C=0.296$ microfarads per mile.

Also let it be assumed that $R=\sqrt{L/C}$ and that the compensation is to be made over the range from 0 to 25 cycles per second.

In Fig. 2 the scale of ordinates gives napiers for attenuation and radians for phase. The curve $a$ gives the absolute value, expressed in napiers as a function of frequency, of the ratio of voltages at the transmitting and receiving ends of the 1,700 mile cable which is terminated by apparatus P of impedance R, and the curve $b$ gives the corresponding value of phase retardation in radians as a function of frequency.

Instead of the characteristics $a$ and $b$, it would be an ideal state of affairs if the characteristic for the attenuation were a horizontal straight line such as $a'$, and if the characteristic for the phase were a straight line through the origin, such as $b'$. This would mean that the attenuation was constant over the frequency range involved and that the phase retardation, measured in radians, was proportional to the frequency, which is equivalent to zero displacement of the various frequencies relatively to one another. The ideal characteristics $a'$ and $b'$ could obviously be obtained for the voltage across the receiver R' if the line were supplemented by a network having the characteristics $A'_p$ and $B'_p$.

The network P has an input impedance R when terminated as it is by the receiver R' of impedance R. It may be more practicable to get the complete desired phase adjustment in a series of sections instead of in a network of a single section, and in the case of a plurality of sections, it will be convenient, but not necessary, to have them alike and essential to have them so designed that there will be no objectionable reflection effects between them.

Figure 7:
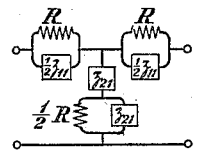
Figure 8:
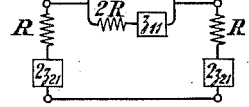
Figure 9:
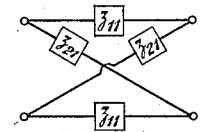

In Figs. 5, 6, 7, 8 and 9, respective network sections are shown, each of them except Fig. 9 comprising one or more resistance elements R (or simple multiples or sub-multiples of R) and all having unknown impedances $z_{11}$ and $z_{21}$. In all of these figures the condition is imposed that $$z_{11} \cdot z_{21} = R^2 \quad (1)$$

that is, $z_{11}$ and $z_{21}$ are inverse networks of impedance product $R^2$. It can readily be shown that if any number of like sections of one of Figs. 5 to 9 are repeated in series to infinity, then the characteristic impedance at all frequencies will be equal to R. For example, taking the characteristic impedance in such case as an unknown quantity and calling it Z, we have the admittance equation for Fig. 6:

$$\frac{1}{Z} = \frac{1}{R+z_{21}} + \frac{1}{z_{11}+Z} \quad (2)$$

This has a solution independent of $z_{11}$ and $z_{21}$, namely, Z=R, and it can be proved similarly for the other Figs. 5 to 9 that when repeated to infinity, they have the characteristic impedance R. In the case of the unsymmetrical sections of Figs. 5 and 6 this applies only to the characteristic impedance from left to right. I call these five networks in order by the titles full-series, full-shunt, mid-series, mid-shunt, and lattice "constant R" networks.

The propagation constants of these networks are dependent upon the form of $z_{11}$ and through Equation (1) on the form of $z_{21}$. It can readily be shown by ordinary means that for Figs. 5, 6, 7 and 8 the current ratio per section of the infinite structure, expressed in terms of the propagation constant $\Gamma$, is given by $$e^{\Gamma} = 1 + \frac{z_{11}}{R},$$

whence
$$z_{11}/R = e^{\Gamma} - 1. \quad (3)$$

For Fig. 9 the current ratio, similarly obtained, is $$e^{\Gamma} = \frac{1+z_{11}/R}{1-z_{11}/R},$$

giving
$$z_{11}/R = \tanh \Gamma/2. \quad (4)$$

Hence, the propagation constant $\Gamma$ and the impedance ratio $z_{11}/R$ are mutually dependent in accordance with the above relations, one fixing the other. The distortion correction problem is thus reduced to the comparatively simple one of determining the locations and magnitudes of impedance elements in $z_{11}$ which over the desired frequency range have approximately the prescribed impedance characteristics.

Therefore, by making the network P of Fig. 1 of a series of sections like any one of Figs. 5 to 9, with R arbitrarily chosen, in this case $\sqrt{L/C}$, it is assured that the network will have the impedance R at all frequencies provided it is suitably terminated at its output end by any network or receiver of resistance R as shown in Fig. 4. The voltage across the input terminals of network P is then independent of the network's transmitting properties and is the same as would be at the receiver if P were omitted entirely. In order to obtain the desired voltage across the receiver it remains to determine the specific design of $z_{11}$ and $z_{21}$ and the number of sections so that the attenuation and phase characteristics of the network correspond to the curves $A'_p$ and $B'_p$ of Fig. 2.

Figure 6:
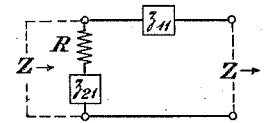

In the particular case now under consideration by way of example, I choose the network section of Fig. 6. If $n$ similar sections are assumed the propagation constant per section should ideally be for the frequency range considered $$\Gamma = A + i B = (A'_p + i B'_p)/n, \quad (5)$$

where $A'_p = a' - a = a_{t_1} + h - a,$
$B'_p = b' - b = b_{t_1}(f/f_1) - b,$
$f_1$ = upper frequency limit of compensation, here 25~.
$h$ = a small positive amount of attenuation, here .3, to be allowed arbitrarily since some dissipation will always be present in a physical passive network,
$a, b$ = voltage attenuation and phase at input of the network.

The latter express the transfer voltage across the network of impedance R which terminates the cable ($r$, L, C) of length $l$ as in the well known formula $$v(i\omega) = \left(\frac{k}{R} \sinh \gamma l + \cosh \gamma l\right)^{-1} = e^{-a-ib}, \quad (6)$$

where
$$\gamma = \sqrt{(r+i\omega L)i\omega C},$$
$$k = \sqrt{(r+i\omega L)/i\omega C}.$$

The ideal impedance ratio $z_{11}/R \equiv r_{11} + i x_{11}$ must have resistance and reactance components $r_{11}$ and $x_{11}$ determined by Equation (3) in which $\Gamma$ has the value of Equation (5). Thus $$r_{11} = e^{A'_p/n} \cos (B'_p/n) - 1,$$
$$x_{11} = e^{A'_p/n} \sin (B'_p/n). \quad (7)$$

To first determine the structure for $z_{11}$ choose some value of $n$ which will ensure merely that the propagation constant per section is within the limits physically demanded by Equation (7) to give a positive resistance component $r_{11}$, namely $$|B'_p/n| < \pi/2, \quad \text{and} \quad (8)$$
$$e^{A'_p/n} \cos(B'_p/n) \geq 1.$$

Here $n=3$ is satisfactory and the ideal resistance component $r_{11}$ decreases from a large value at zero frequency to a small value at $f_1 = 25\sim$ while the ideal reactance component $x_{11}$ decreases from zero at zero frequency to a minimum and then increases to zero at $f_1$. It will readily be recognized that a physical impedance having approximately these characteristics is that shown for $z_{11}$ in Fig. 3 where $z_{11}$ takes the form of a parallel combination having a resistance $R_{12}$ on one side and the resistance $R_{11}$, the inductance $L_{11}$, and the capacity $C_{11}$ in series on the other side.

Having thus determined a possible type of structure for $z_{11}$ we need to fix the best number $n$ of sections of this type and assign values to the elements of $z_{11}$ which approximately give the ideal propagation constant. The form of $z_{21}$ and the values of its elements are determined by Equation (1). To obtain the five unknowns $n$, $R_{12}$, $R_{11}$, $L_{11}$, and $C_{11}$ it is convenient to use the five conditions $h =$ a small assumed value $= .3$ napiers
$a_0 =$ value of $a$ at zero frequency $= 4.396$ napiers
$a_{t_1} =$ value of $a$ at zero $f_1$ frequency $= 14.10$ napiers
$f_m =$ frequency at which $B'_p$ is a minimum $= 9$ cycles/sec.
$(B'_p)_{t_m} =$ ideal minimum phase $= -2.75$ radians.

The impedance expression for $z_{11}$ is $$z_{11} = \frac{R_{12}(R_{11} + i(L_{11} 2\pi f - 1/C_{11} 2\pi f))}{R_{11} + R_{12} + i(L_{11} 2\pi f - 1/C_{11} 2\pi f)}, \quad (9)$$

whence $$\frac{z_{11}}{R} = r_{11} + i x_{11}, \quad (10)$$

where $$r_{11} = \frac{cg(c+g) + d^2 g y^2}{(c+g)^2 + d^2 y^2},$$

$$x_{11} = \frac{d g^2 y}{(c+g)^2 + d^2 y^2},$$

and the substitutions are $$R_{12}/R = g,$$
$$R_{11}/R = c,$$
$$L_{11}/R = d/2\pi \quad (11)$$
$$RC_{11} = 1/(2\pi f_1^2 d),$$
$$(f - f_1^2/f) = y.$$

Also Equation (3) gives $$\tan B = \frac{x_{11}}{1 + r_{11}} \quad (12)$$

To satisfy the condition at $f=0$ in Equation (7), we obtain from Equations (5) and (10)

$$g = e^{(a_{t_1} + h - a_0)/n} - 1, \quad (13)$$

one relation between $g$ and $n$. Another relation can be found from the required minimum phase $(B'_p/n)_{t_m}$ at $f_m$. At this minimum $$\frac{dB}{df} = 0,$$

so that by Equations (10) and (12)

$$\frac{g^2}{g+1}\left(1 + c + (2+c)c/g + c^2/g^2\right) = d^2(f_1^2/f_m - f_m)^2, \quad (14)$$

and $$\tan B_m = -g/2\left((g+1)(1 + c + (2+c)c/g + c^2/g^2)\right)^{\frac{1}{2}}. \quad (15)$$

The value of $c$ comes from the relation at $f_1$ and is $$1/c = 1/(e^{h/n} - 1) - 1/g. \quad (16)$$

Since $h/(a_{t_1} - a_0)$ is small, $c/g$ will here always be small compared to unity and therefore the approximate result from Equation (16), $1 + c = e^{h/n}$, can be used in (15) where also powers of $c/g$ are neglected. With these approximations, the second relation between $g$ and $n$ becomes from Equation (15)

$$\tan(B'_p/n)_{t_m} = -g \, e^{-h/2n}/2(g+1)^{\frac{1}{2}}. \quad (17)$$

The elimination of $g$ between Equations (13) and (17) gives the transcendental equation specifying $n$ $$\tan(B'_p/n)_{t_m} + e^{-h/2n} \sinh\left((a_{t_1} + h - a_0)/2n\right) = 0. \quad (18)$$

Owing to the fact that $n$ must be an integer, the proper value for $n$ is that one which most nearly satisfies Equation (18).

To the same order of approximation as Equation (17), $d$ from (14) is $$d = g e^{h/2n}/(f_1^2/f_m - f_m)(g+1)^{\frac{1}{2}}. \quad (19)$$

Hence, the unknown parameters are to be determined from the above equations in the following order:

$$\begin{matrix} n \text{ from Equation (18),} \\ g \text{ from Equation (13),} \\ c \text{ from Equation (16),} \\ d \text{ from Equation (19).} \end{matrix} \quad (20)$$

For the example under consideration the solution is $$\begin{matrix} n=2, \\ g=147.7, \\ c=.162, \\ d=.2155. \end{matrix}$$

Hence, from Equations (11) and (1) the particular values taken by the resistance and reactance elements of Fig. 3 are as follows:

$R = 58.1$ ohms;
$R_{12} = 8580$ ohms;
$R_{11} = 9.4$ ohms;
$L_{11} = 1.99$ henrys;
$C_{11} = 20.3$ microfarads;
$R_{22} = 0.39$ ohms;
$R_{21} = 358$ ohms;
$L_{21} = 0.0685$ henrys;
$C_{21} = 590$ microfarads.

The network consisting of the two sections shown at the left in Fig. 3, when alone and when combined with the line $L'$, gives the respective attenuation and phase characteristics $A_p$, $B_p$ and $A_s$, $B_s$ of Fig. 2. The curve $A_s$ indicates an approximately uniform attenuation for the line and network over the whole frequency range from 0 to 25 cycles per second. Above 25 cycles the characteristic turns decidedly upward, indicating greater attenuation for higher frequencies, which is obviously desirable when only the range below 25 cycles is to be utilized. The phase characteristic $B_s$ corresponds approximately to a straight line through the origin most of the way from 0 to 25 cycles per second, which means that the phase measured in radians is substantially proportional to the frequency, and accordingly, any wave form will be received with its components within the range in substantially the same relation in order of time.

It remains to supplement the network described thus far with the amplifier indicated as $m^2$. Letting $m$ be the desired amplification per section of network, the total amplification is $m^2$ because there are two such sections.

Fig. 10 shows the "arrival curve" for the line $L'$ at 1, and at 2 it shows the arrival curve for the combined line and network. The improvement due to the network is obvious.

A similar procedure can be carried out for the lattice structure (Fig. 9), based upon Equation (4). Or, if the ladder network in the form of Figs 7 or 8 is known, the corresponding lattice section can be derived by the aid of formulas given in my paper in the Bell System Technical Journal for January, 1923.

Instead of a separate amplifier as at $m^2$ in Fig. 3, the sections of the network can be designed so as to afford the proper amplification within each section. This is illustrated in Fig. 11. The equation for the propagation constant $\Gamma$ in any ladder type constant R network such as in Figs. 5 to 8 is given by Equation (3).

Now assume a network of the same type as in Fig. 3, except that it amplifies by the factor $m$. For this network we have the equation:

$$e^{\Gamma'} = 1 + z'_{11}/R = (1 + z_{11}/R)/m$$

whence $$z'_{11} = \frac{R + z_{11}}{m} + (-R).$$

By reference to Figs. 6 and 3, and with the data for Fig. 3, the construction and details of Fig. 11 follows at once. The element represented by $(-R)$, a "negative resistance", may comprise one or more three-electrode vacuum tube amplifiers.

In the use of the terms "impedance" and "resistance" it will be advantageous to remember that for any frequency of alternating current the impedance is the ratio of electromotive force to current, and that in general the impedance will be a vector which may be represented by a complex number; if this ratio is a real number, it means that the impedance is a pure resistance.

I claim:

1. In combination, a transmission line producing various phase displacements and various degrees of attenuation for component currents of various frequencies, and a network connected with the line and producing compensating phase displacements and attenuations at the respective frequencies, whereby the current received over the line and through the network has its components in the same phase relation and the same relative magnitude as the transmitted current.

2. In combination, a transmission line having its characteristic impedance approximately a resistance R, and producing various phase displacements and various degrees of attenuation for component currents of various frequencies, a receiver of resistance R, and a series of network sections of "constant R" type connected with the line, said network sections compensating the phase and attenuation distortion on the line.

3. In combination, a transmission line producing various phase displacements and various degrees of attenuation for component currents of various frequencies, and a series of network sections connected with the line, each producing partial compensating phase displacements and attenuations at the respective frequencies, whereby the total compensation of the network neutralizes the distortion on the line, and the received current has its components in the same phase relation and the same relative magnitude as the transmitted current.

4. A device having a pair of input terminals and a pair of output terminals and adapted to distort a current through it in respect to the phase relations of the different frequency components, said device consisting of at least one section of "constant R" network subject to the relation $z_{11}.z_{21} = R^2$, with $z_{11}$ formed of impedance elements combined to give the desired phase distortion.

5. In combination, a transmission line producing various phase displacements and various degrees of attenuation for component currents of various frequencies, a "constant R" network connected therewith to compensate phase displacements and attenuations at the respective frequencies, and an amplifier to bring the compensated current up to the desired magnitude.

6. The method of compensating for phase distortion and amplitude distortion in a transmission line, which consists in counterdistorting the currents received over the line both for amplitude and phase distortion, and thereafter keeping the ratio of electromotive force to current at a constant real number value and also before such counterdistortion keeping the ratio of current to electromotive force at the same constant real number value and thereby keeping the current after such counterdistortion with its components in the same phase relation as at the sending end and of the same relative magnitude.

7. The method of compensating for distortion in a transmission line, which consists in plotting the angular retardation in radians and the attenuation in napiers against frequency for the various frequency components in the received current, drawing a straight line through the origin intersecting the retardation plot at the upper limiting frequency of the desired range, and drawing another horizontal straight line, these straight lines being ideal for retardation and attenuation characteristics, and affecting the received current from the line so as to produce therein complementary retardations and attenuations at the various frequencies keeping the ratio of electromotive force to current at a constant real number value both before the current is so affected and thereafter, whereby the output current from the network conforms approximately to the said ideal characteristics.

8. In combination, a transmission line for a composite electric current producing various phase displacements and various degrees of attenuation for component currents, a transmitter and a receiver associated with said line and a network also associated with the line and producing compensating phase displacements and attenuations at the respective frequencies whereby the current at the receiver has its components in the same phase relation and in the same relative magnitude as at the transmitter.

9. In combination, a transmission line producing various phase displacements and various degrees of attenuation for component currents of various frequencies and a sectional "constant R" network associated with the line and producing compensating phase displacements and attenuations at the respective frequencies whereby the current received over the combination of the line and network has its components in the same phase relation and the same relative magnitude as the transmitted current.

In testimony whereof, I have signed my name to this specification this 20th day of June, 1924.

OTTO J. ZOBEL.